US008855186B2

(12) United States Patent
Tan

(10) Patent No.: US 8,855,186 B2
(45) Date of Patent: Oct. 7, 2014

(54) METHODS AND SYSTEMS FOR PROVIDING OPTIMUM DECISION FEEDBACK EQUALIZATION OF HIGH-SPEED SERIAL DATA LINKS

(75) Inventor: Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 108 days.

(21) Appl. No.: 13/326,753

(22) Filed: Dec. 15, 2011

(65) Prior Publication Data

US 2012/0320964 A1 Dec. 20, 2012

Related U.S. Application Data

(60) Provisional application No. 61/450,542, filed on Mar. 8, 2011.

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .............................. *H04L 25/03057* (2013.01)
USPC ........... 375/233; 375/213; 375/231; 375/348; 375/350

(58) Field of Classification Search
CPC ..................... H04L 1/205; H04L 2025/03617; H04B 1/00
USPC .......... 375/211, 213–215, 219–222, 224–233
See application file for complete search history.

(56) References Cited

U.S. PATENT DOCUMENTS

| | | | |
|---|---|---|---|
| 7,408,363 B2 | 8/2008 | Tan et al. | |
| 7,460,983 B2 | 12/2008 | Pickerd et al. | |
| 8,374,231 B2 | 2/2013 | Tan | |
| 8,472,513 B2 * | 6/2013 | Malipatil et al. | 375/233 |
| 2002/0123350 A1 * | 9/2002 | Bui | 455/450 |
| 2003/0072363 A1 | 4/2003 | McDonald et al. | |
| 2005/0238093 A1 * | 10/2005 | Payne et al. | 375/224 |
| 2006/0176984 A1 | 8/2006 | Lee et al. | |
| 2006/0182231 A1 | 8/2006 | Tan et al. | |
| 2007/0201544 A1 | 8/2007 | Zhu | |
| 2007/0217558 A1 * | 9/2007 | Abel et al. | 375/355 |
| 2007/0237186 A1 * | 10/2007 | Shumarayev et al. | 370/535 |

(Continued)

FOREIGN PATENT DOCUMENTS

WO 2005101652 A1 10/2005

OTHER PUBLICATIONS

Propstra, "SAS 6G Equalization Measurement proposal" (07-467r0) T10/07-467rO, 2007.

(Continued)

*Primary Examiner* — Sam K Ahn
*Assistant Examiner* — James M Perez
(74) *Attorney, Agent, or Firm* — Capitol Patent & Trademark Law Firm, PLLC; Thomas F. Lenihan

(57) ABSTRACT

Computationally efficient methods and related systems, for use in a test and measurement instrument, such as an oscilloscope, optimize the performance of DFEs used in a high-speed serial data link by identifying optimal DFE tap values for peak-to-peak based criteria. The optimized DFEs comply with the behavior of a model DFE set forth in the PCIE 3.0 specification.

16 Claims, 8 Drawing Sheets

(56) References Cited

U.S. PATENT DOCUMENTS

| | | |
|---|---|---|
| 2007/0276614 A1 | 11/2007 | Tan et al. |
| 2007/0276622 A1 | 11/2007 | Pickerd et al. |
| 2008/0008280 A1 | 1/2008 | Zhu |
| 2008/0043884 A1 | 2/2008 | Zhu |
| 2008/0049824 A1 | 2/2008 | Yang |
| 2008/0049871 A1 | 2/2008 | Yang |
| 2008/0063043 A1 | 3/2008 | Xia |
| 2008/0181292 A1 | 7/2008 | Yang |
| 2008/0260014 A1 | 10/2008 | Yang |
| 2010/0085362 A1 | 4/2010 | Tan |
| 2010/0177816 A1* | 7/2010 | Malipatil et al. ............... 375/233 |
| 2010/0329325 A1* | 12/2010 | Mobin et al. .................. 375/232 |

OTHER PUBLICATIONS

Agili, "De-Embedding Techniques in Signal Integrity: A Comparison Study", 2005.

Application Note 1364-1, Agilent Technologies, "De-embedding and Embedding S-Parameter Networks Using a Vector Network Analyzer," May 30, 2004, pp. 1-24.

Application Note, Anritsu, Scorpion "Embedding/De-embedding," May 2002, pp. 1-16.

Bah, "SAS-2 Delivered Amplitude Calibration for Receiver Testing", Nov. 5, 2007 T1 0/07-492rO.

John R. Barry, Edward A. Lee, David G. Messerschmitt, "Digital communication," Kluwer Academic Publishers. 2004, pp. 5, 345-346, 369, 378, 445-446, 740.

Adam Healey, Mark Marlett "Introduction to DFEEYE," www.t11.org. 2007.

"SAS-2 6Gbps PHY Specification," www.t10.org, 2008, pp. 14, 36-37.

"PCI Express Base 3.0 Specification," www.pcisig.com, 2010, pp. 325, 335-339, 369-371, and 398-399.

Stephen Boyd, Lieven Vandenberghe, "Convex Optimization," Cambridge University Press. 2009, pp. 6-7, 146-152.

* cited by examiner $y_k = x_k - d_1 \text{sgn}(y_{k-1})$ $y_k$ = DFE summer differential output voltage $y^*_k$ = decision function output voltage $|y^*_k| = 1$ $x_k$ = DFE differential input voltage $d_1$ = feedback coefficient $k$ = sample index in UI

METHODS AND SYSTEMS FOR PROVIDING OPTIMUM DECISION FEEDBACK EQUALIZATION OF HIGH-SPEED SERIAL DATA LINKS

RELATED APPLICATIONS

This application is related to, and claims the benefit of priority of, U.S. Provisional Application No. 61/450,542 filed Mar. 8, 2011 and incorporates by reference herein, as if set forth in full herein, the contents of U.S. Provisional Application No. 61/450,542. This application is also related to U.S. Non-Provisional patent application Ser. No. 12/423,604 filed Apr. 14, 2009, assigned to the same assignee as the present application, and incorporates by reference herein, as if set forth in full herein, the contents of U.S. Non-Provisional patent application Ser. No. 12/423,604. To the extent that any of the disclosure in U.S. Non-Provisional patent application Ser. No. 12/423,604 conflicts or appears to conflict with the disclosure of the present specification, the disclosure of the present specification shall take precedence and govern the resolution of any such conflict.

BACKGROUND

Generally speaking, a communication system is composed of a transmission means (e.g., transmitter) that transmits a signal, a "medium" through which the signal is transmitted and a reception means (e.g., receiver) for receiving the transmitted signal. As is known in the art, the medium may take any one of a number of physical forms, such as a copper wire, coaxial cable or in the case of wireless transmission, the air. A word used synonymous with "medium" is "transmission channel" or "channel" for short. FIG. 1 depicts a generalized communication system 1. As shown, a transmission means (abbreviated "Tx") 2 transmits an analog waveform signal containing information through a wired channel 3 to a reception means 4 (abbreviated "Rx"). As is also known in the art, the analog waveform signal may be transmitted through the channel 3 at varying speeds ranging from a few kilobits per second to many gigabits per second (abbreviated "Gb/s").

So-called high speed, serial data link systems involve the transmission of signals at speeds of 6 Gb/s and beyond. At such speeds, "equalization" techniques are needed, typically at the reception means or receiving end of the channel, to correct for the degradation of the signal as it passes through the channel 3 due to physical phenomena commonly referred to as channel loss, reflection, cross talk, and noise to name a few. In general, equalization involves the removal or "filtering" out of undesirable components of a signal that lead to the signal's degradation, components that were added by the phenomena discussed above as well as others.

In the high-speed, serial data link industry, standards have been promulgated that govern the type of equalization measurements to be applied. One such standard is that promulgated by the SAS-2, 6G standards committee. The standard involves an equalization method using a so-called "training sequence". A training sequence is used to, generally speaking, adjust an equalization filter so that it can correctly remove undesirable signal components from digitized samples of a received analog waveform signal. Typically, a training sequence is derived from digitized samples (e.g., bits) of a received signal.

Determining the training sequence associated with digitized samples of a given analog waveform signal is not a trivial matter, however. U.S. Non-Provisional patent application Ser. No. 12/423,604 mentioned above sets forth various methods and systems (referred to as "equalization simulators") for determining the training sequence of a signal in a high-speed, serial data link system using a real-time or sampling oscilloscope. Before a so-determined training sequence can be used to remove degradations from the signal, however, it must be aligned with re-sampled, digitized samples of the received analog waveform signal. U.S. Non-Provisional patent application Ser. No. 12/423,604 discloses techniques for doing so.

In effect, the use of a training sequence identifies those components of an original, analog waveform signal that must be removed or otherwise adjusted to correct for the effects of signal degradations. What remains is to actually remove or adjust such components by an appropriate, estimated amount. To do so, additional equalization or filtering is required.

A well-known technique for removing signal degradations, especially those caused by Inter-Symbol interference (ISI) due to channel insertion loss and reflections, or noise from crosstalk and other sources, is the non-linear, decision feedback equalizer (DFE). As is known in the art, a DFE uses proper values for so-called "tap coefficients" to effectively remove signal degradations. The values of the tap coefficients may be derived in part from a determined training sequence. The process of finding the proper values for "tap coefficients" in a DFE is referred to as an equalizer adaptation process. A DFE's tap coefficient values may be adapted to different values on different channels that cause different signal degradations. The behavior of a model DFE as set forth in the PCI Express or Peripheral Component interconnect Express 3.0 specification (sometimes referred to as "PCIE 3.0" for short) is shown in FIG. 2. One form of a DFE that has been implemented in accordance with the model DFE shown in FIG. 2 to determine tap coefficients uses a so-called "exhaustive search" process. However, the inventor has found that this form of a DFE does not yield precise results and is computationally inefficient because it requires the analysis of many data points.

Accordingly, one objective of the present invention is to provide methods and systems that are more precise and computationally efficient in order to optimize the performance of DFEs used in a high-speed serial data link.

Another objective of the present invention is to provide methods and systems that optimize the performance of DFEs used in a high-speed serial data link by identifying optimal DFE tap values.

Yet another objective of the present invention is to provide methods and systems that optimize the performance of DFEs used in a high-speed serial data link by identifying optimal DFE tap values, where the optimized DFEs also comply with the behavior of a model DFE set forth in PCIE 3.0.

Other objectives and their related advantages provided by the present invention will be apparent from the text which follows along with the associated figures, read in conjunction with the appended claims.

SUMMARY

The present invention provides explicit DFE adaptation methods and related systems that find optimal DFE tap values for peak-to-peak based criteria.

Embodiments of the present invention may include methods and systems for optimizing the equalization of a high-speed data link comprising: a processor operable to execute stored instructions for, generating minimum and maximum voltage array input values derived from a sampled input signal; generating minimum and maximum voltage array output values representing a plurality of eye heights based on generated voltage array input values associated with a specified horizontal position of the unit interval and a feedback coefficient value; identifying a maximum voltage value representing a maximum eye height based on the generated voltage array output values; identifying one or more optimum feedback coefficient values based on the identified, maximum voltage value; and generating a non-linear, equalized output signal based on the one or more identified, optimum feedback coefficient values. The systems and methods may more particularly comprise or utilize a performance oscilloscope, such has a real-time oscilloscope or a sampling oscilloscope.

The data link being optimized may be a high speed serial data signal of at least 6 gigabits per second.

In additional embodiments of the invention, the methods and systems include the generation of a continuous, linearly equalized signal from the input signal prior to a DFE adaption process. In yet a further embodiment of the invention a performance oscilloscope for optimizing the equalization of a high-speed data link is provided that comprises a user interface for activating a DFE adaption process for a high speed serial data signal of at least 6 gigabits per second, and for indicating when a DFE adaption process, that identifies one or more optimum feedback coefficient values based on an identified, maximum voltage value associated with a specified horizontal position of the unit interval, is completed; and a display for displaying the user interface.

DETAILED DESCRIPTION OF THE EMBODIMENTS

In accordance with the present invention, exemplary embodiments of DFEs are presented that utilize an explicit adaptation method, instead of an exhaustive search method, to identify optimal DFE tap coefficient values based on peak-to-peak based criteria. The explicit adaptation method provides a closed form solution (i.e., the optimal tap coefficient values are computed directly, not iteratively). Such DFEs comply with the behavior of a model DFE defined in the PCIE 3.0 specification.

Figure 2:
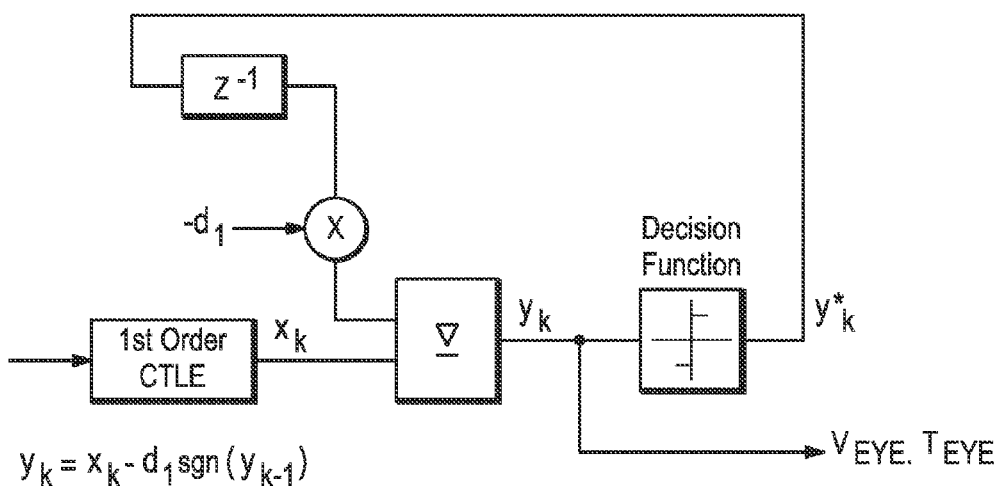
FIG. 2 is a representation of the behavior of a model, receiver based DFE in accordance with the PCIE 3.0 standard.
Figure 3:
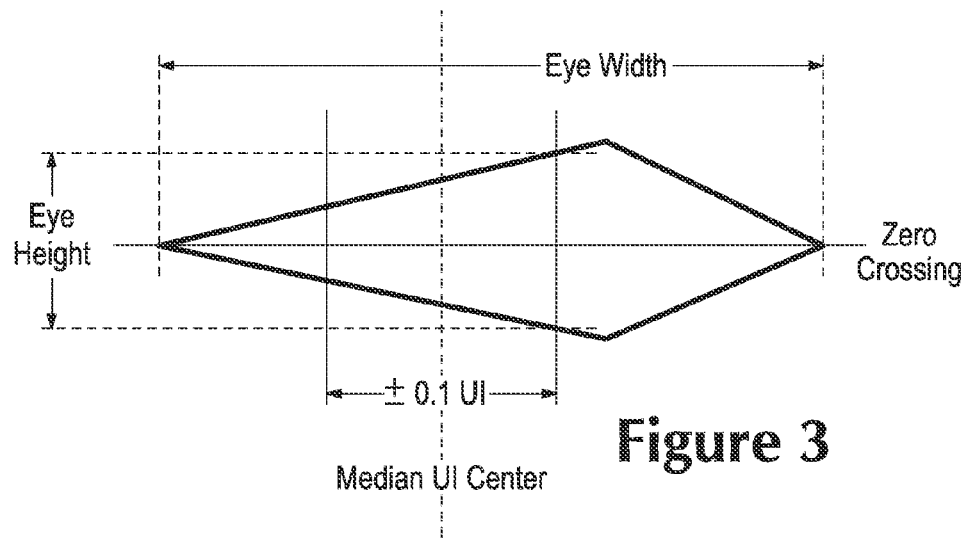
FIG. 3 depicts an eye height measurement specified by the PCIE 3.0 specification.

Referring back to FIG. 2, the model, receiver-based DFE takes an analog output signal $x_k$ from a continuous linear equalizer (CTLE), and outputs an equalized analog signal $y_k$ and digital signal $y*_k$, where:

$$y_k = x_k - d_1 \text{sgn}(y_{k-1}) \tag{1}$$

$$y*_k = \text{sgn}(y_k), |y*_k| = 1 \tag{2}$$

and where $y_k$, may be modeled as a DFE, summed differential output voltage, $y*_k$ as a decision function output voltage, $x_k$ as a DFE differential input voltage, $d_1$ as a feedback coefficient, and k as a sample index in UI. The PCIE 3.0 specification requires that a DFE adaption method identify an optimal value for the feedback coefficient $d_1$ so that the eye height $V_{eye}$ and eye width of a signal, as displayed on an oscilloscope for example, are maximized. $V_{eye}$ is measured from the maximum of bit 0's and minimum of bit 1's evaluated at a specified horizontal position of the unit interval (UI), usually, around UI center, as illustrated in FIG. 3.

In accordance with embodiments of the present invention, DFE adaptation methods and systems are provided that identify optimal tap coefficient values that are associated with a maximized eye height measured at one specific horizontal position of the UI. In additional embodiments of the invention, once the optimal tap coefficient values are found that are associated with a maximized eye height, methods and systems may search the neighborhood around these tap coefficient values to identify optimal values that will maximize an eye area.

As is known in the art, the maximization of eye height uses a peak-to-peak based criteria. PCIE 3.0 specifies $d_1$ to be between in the range [−30 mV, 30 mV].

A known exhaustive search methodology mentioned briefly before analyzes data points throughout this range (referred to as the "allowed coefficient space"). To ensure a degree of accuracy the step size used to analyze all of the data points is small, which means that the exhaustive search method must check a lot of data points. This takes time. As a result, the exhaustive search method sacrifices computational speed for accuracy. For some applications, the sacrifice in computational speed is unacceptable. For example, the testing of some devices, etc., requires high speed computations and throughput, which translates into high speed, computationally efficient, DFE adaptation. For the reasons set forth above, the exhaustive search methodology was found to be inadequate by the present inventor.

Figure 4:
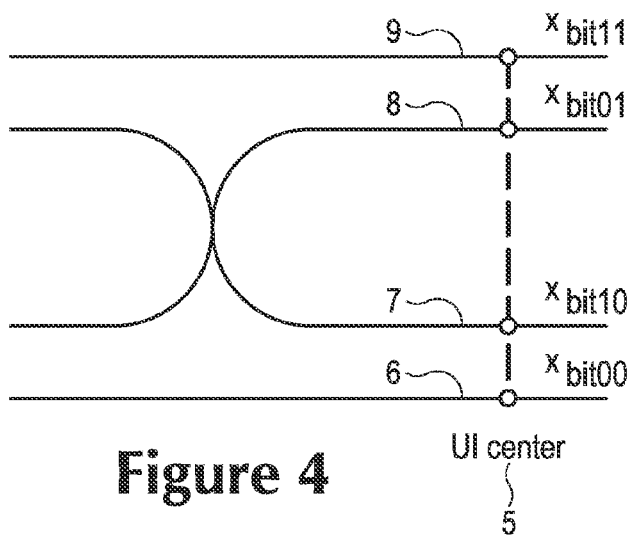
FIG. 4 depicts 2-bit sequence combinations in accordance with an embodiment of the present invention.

Backtracking somewhat, as noted briefly before, a DFE uses a training sequence which may sometimes also be referred to as a "decision bit" sequence. Because of this a DFE may be characterized as using a "decision on previous bits" to determine a coefficient feedback value. As is known in the art, in accordance with PCIE 3.0 when optimal tap values are identified, the tap values remain unchanged unless the channel or transmitter is changed. Thus, in accordance with embodiments of the present invention once optimal tap values are identified they may be used to identify all of the components of an analog waveform input signal (or bits of its digitized version) that need to be adjusted to account for signal degradations. For example, in the model DFE shown in FIG. 2, the output $y_k$ is determined by the input $x_k$ and a decision on previous bit, denoted as $y*_{k-1}$. U.S. Non-Provisional patent application Ser. No. 12/423,604 mentioned before sets forth methods and systems for identifying or determining a decision bit or training sequence, denoted $y*_k$, for an input signal $x_k$ using a performance oscilloscope, such as a sampling oscilloscope or real-time oscilloscope. For present purposes, it is assumed that a decision bit or training sequence $y*_k$ has already been identified or determined. In accordance with an embodiment of the invention, the input signal can be associated with one of four 2-bit combinations, such as the combination denoted by points 6-9 in FIG. 4, according to the identified sequence. The combinations may then be used to generate and display a shifted eye diagram as shown, for example, in FIG. 4 on a performance oscilloscope.

Figure 5:
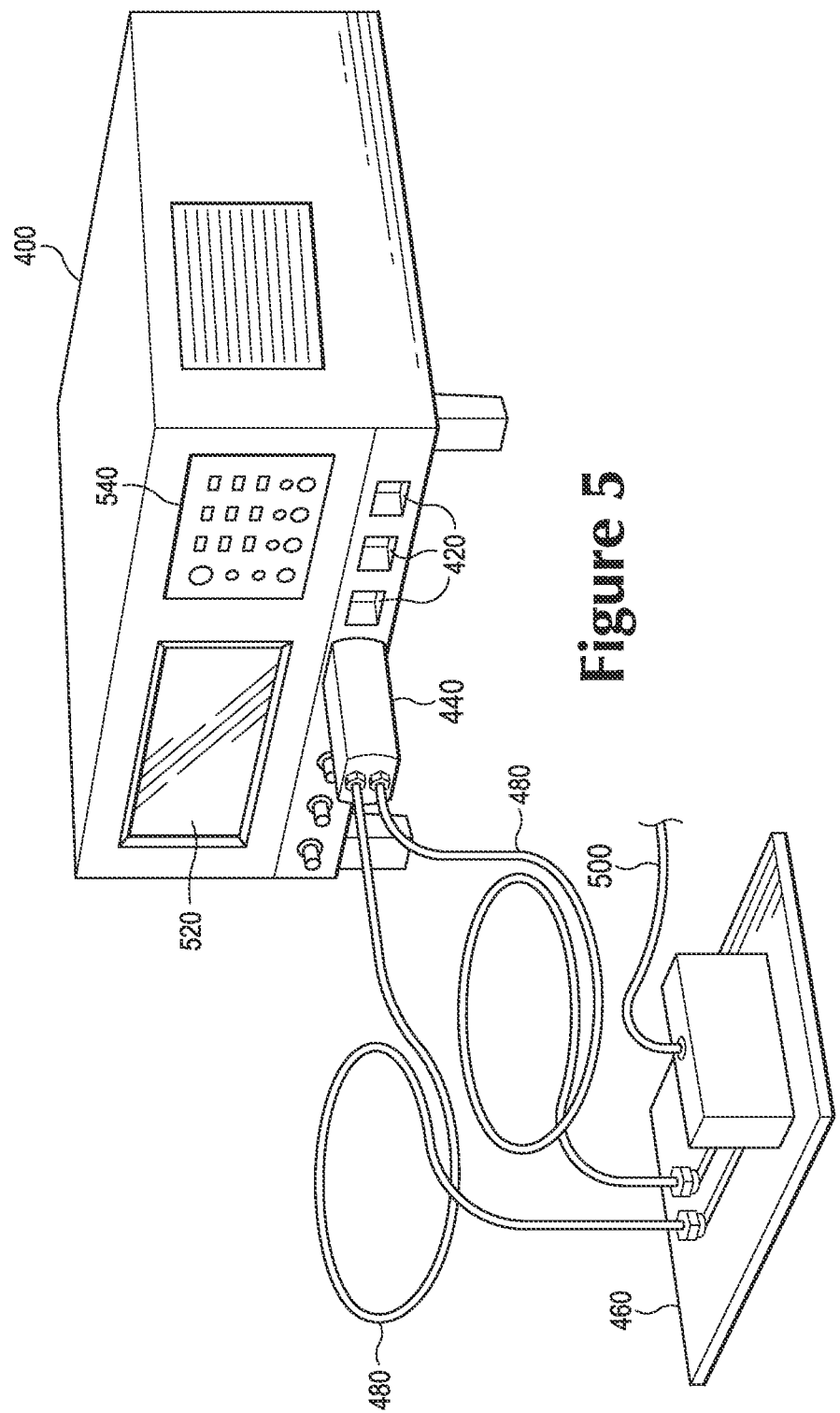
FIG. 5 depicts a measurement setup using an oscilloscope according to one embodiment of the present invention.

Referring to FIG. 5 there is depicted a simplified illustration of a system 400, such as an oscilloscope, that includes elements for optimizing DFE in a high-speed serial data link according one embodiment of the present invention. It should be understood that all of the methods and processes discussed herein, and those set forth in U.S. Non-Provisional patent application Ser. No. 12/423,604 mentioned before may be implemented using an oscilloscope that includes substantially similar elements as the oscilloscope shown in FIG. 5. In embodiments of the invention the system 400 may comprise a performance oscilloscope, such as a real-time oscilloscope or sampling oscilloscope.

System 400 may, for example, take the form of one or more oscilloscopes designed and developed by Tektronix, Inc. The oscilloscope 400 may include multiple accessory interfaces 420 for connecting one or more accessory devices 440, such as differential probes designed and developed by Tektronix, Inc, to the oscilloscope 400. The accessory interfaces 420 may provide voltage power from the oscilloscope 400 to the accessory devices, which in the exemplary embodiment shown in FIG. 5 comprises a differential probe 440. The accessory interfaces may also provide bi-directional communications between the oscilloscope 400 and the probe 440. The probe 440 may be coupled via SMA coaxial cables 480 to a device under test (DUT) 460, such as a test fixture coupled to a SAS 6 G cable 500 acting as a channel in a high speed serial data link system.

The probe 440 may comprise a control box connected to the oscilloscope and a probe head coupled by a signal cable to the control box. The probe 440 may be coupled to the text fixture 460 using probing contacts.

The oscilloscope 400 may include a display device 520 which may include a graphical user interface for displaying signals processed by the oscilloscope 400 from DUT 460. Generally, oscilloscope 400 may include front panel controls 540, such as rotatable knobs, push buttons and the like for controlling the settings of the oscilloscope. Alternatively, the front panel controls may be graphically generated and presented as so called "soft keys" on the display section 520 so as to be accessed by a user of the oscilloscope 400.

It should be noted that although the channel 500 depicted in FIG. 5 is represented by cable 500, that the channel 500 may take the form of other mediums, such as copper wire, coaxial cable or may be simulated. Either way, the channel 500 includes impairments which degrade the signal being input into the DUT 460. These impairments must be removed and/or adjusted by the oscilloscope 400 in accordance with embodiments of the present invention. Alternatively, the DUT 460 may be removed and the oscilloscope 400 may be directly connected to the channel 500 (actual channel or simulated channel).

Figure 1:
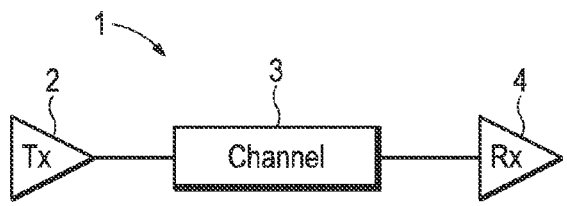
FIG. 1 is representation of a high speed, serial data link system.

Viewed from another perspective, it should be understood that in one embodiment of the invention the oscilloscope 400 is an example of the reception means or receiver 16 depicted in FIG. 1. In an alternative embodiment, the oscilloscope 400 may also be placed before the channel 14 shown in FIG. 1 to, in effect, test the performance of the transmission means or transmitter 12, for example. In either case, the oscilloscope 400 may be connected to the channel 14 or transmission means 12 using an actual or simulated channel 500.

Figure 6:
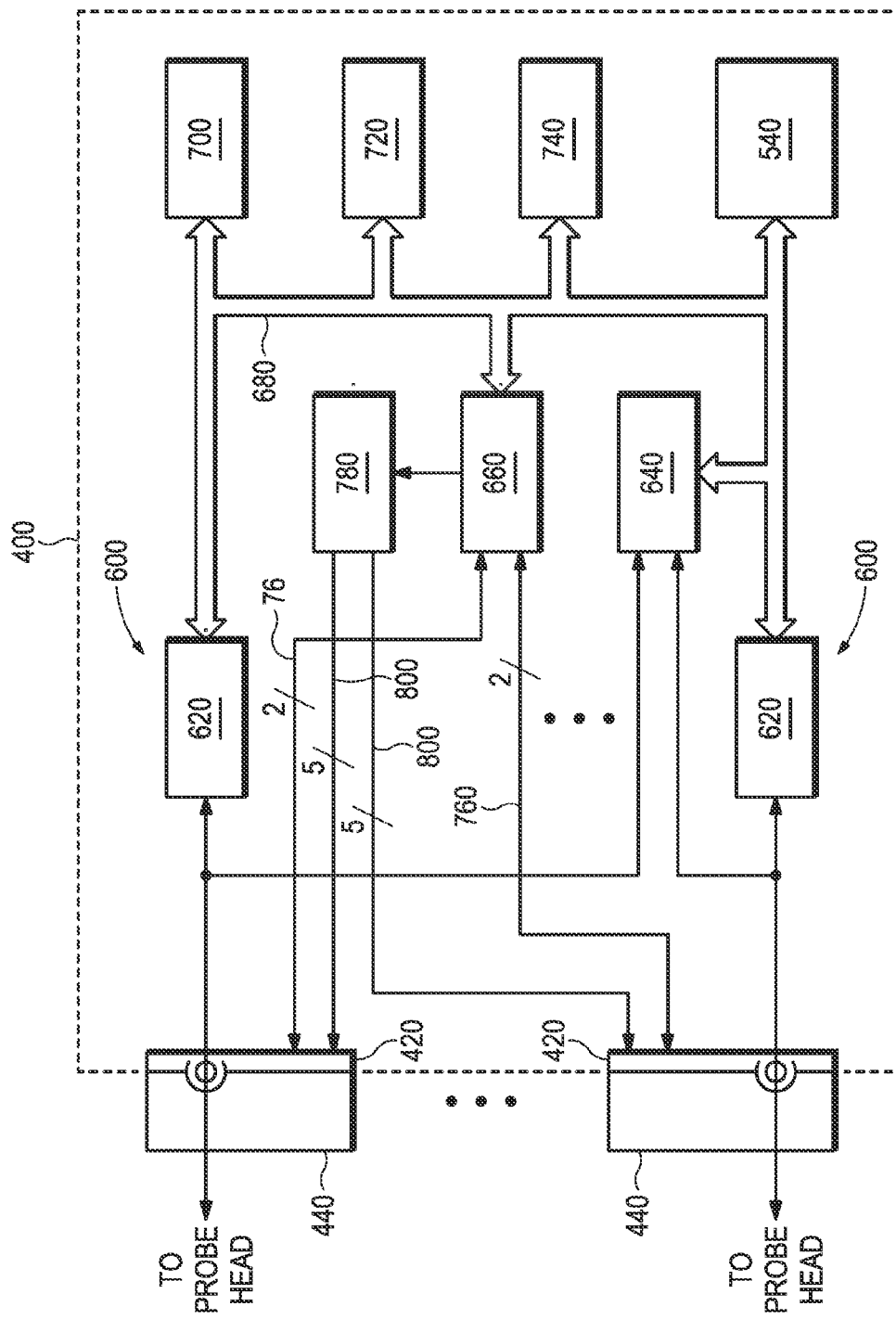
FIG. 6 depicts a functional block diagram of an oscilloscope according to one embodiment of the present invention.

Referring now to FIG. 6, there is shown a representative block diagram of an oscilloscope according to one embodiment of the present invention. More particularly, shown is a block diagram of the oscilloscope 400 depicted in FIG. 5. The oscilloscope 400 may have separate signal channels 600 coupled to the accessory interfaces 420, two of which are represented in FIG. 6. Each signal channel 600 may have a separate acquisition means 620 that may include, for example, known electronic circuitry and/or devices for at least receiving an analog waveform input signal from the DUT 460 or channel 500 and converting the received signal into digitized samples. Each of the analog waveform input signals coupled to the signal channels 600 may also be coupled to trigger circuitry 640. The acquisition means 620 and the trigger circuitry 640 may be coupled to a programmable processing means 660 via a system bus 680. The system bus 680 may be further coupled to memory means 700 that may, for example, take the form of RAM, ROM and/or cache memory. RAM memory is operable to store volatile data, such as the digitized samples of the analog waveform input signal generated by the acquisition means 620. The system bus 680 may be further coupled to display circuitry 720 for controlling the display section 520 shown in FIG. 5, a mass storage unit or units 740, such as a hard disk drive, CD ROM drive, tape drive, floppy drive or the like that reads from and/or writes to appropriate mass storage media, and the front panel controls 540. It should be understood that any number of signal channels 600 may be included in the oscilloscope 400 with each channel having separate acquisitions means 620.

Executable instructions for implementing the equalization methods according to embodiments of the present invention and for otherwise controlling the oscilloscope 400 may be stored and accessed from memory means 700, more particularly, for example from ROM. Alternatively, the executable instructions may be stored and accessed from mass storage media of the mass storage unit 740 which in some embodiments may be included within memory means 700. The processing means 660 may be implemented as, for example, one or more programmable microprocessors, such as those designed and developed by Intel Corporation. The processing means 660 may also be implemented using multiple programmable controllers and/or one or more programmable digital signal processors. In yet another embodiment, when the processing means 660 is implemented using multiple controllers one may be used to control the acquisition and processing of the analog waveform input signal while the second may control the other operations of the oscilloscope 400. The oscilloscope 400 may be controlled using a Windows™ Operating System, such a Windows® XP®, designed and developed by Microsoft, Corporation that is stored and accessed within one or more processors or controllers 660 and associated memory means 700.

The display circuitry 720 may include a display controller (not shown) for receiving instructions for controlling the display section 520 from processing means 660 and may receive data as well from a digital signal processor, for example, that is a part of processing means 660 for display by the display section 520. A bus controller (not shown) may also be included within the processing means 660 or included separately within the oscilloscope 400 for monitoring interfaces 420 and probes 440. The bus controller may also control communications between the probes 440 and the processing means 660 via communications bus 760. The bus 760 may comprise an I.sup.2C bus, IEEE 1494 bus, USB bus or the like, that provides bi-directional communications.

A power supply 780 may receive control signals from the processing means 660 for controlling the electrical power to the probes 440 via voltage lines 800 and the accessory interfaces 420.

Continuing, referring back to FIG. 4, as mentioned before embodiments of the present invention are directed at DFE adaptation methods and systems that maximize an eye height measured at one specific horizontal position of a UI, such as point 5 shown in FIG. 4. In particular, in one embodiment of the invention the processing means 660 may comprise a programmable digital signal processor ("processor" for short"), for example, which may be operable to access and execute instructions and associated data stored within memory means 700 in order to optimizing DFE in a high-speed serial data link by maximizing an eye height measured at one specific horizontal position of a UI. Such executable, stored instructions and data may be used by the processor 660 to select the specified horizontal position of the UI. In more detail, the processor 660 may be further operable to access executable instructions and data stored within memory means 700 in order to identify one or more voltages associated with the specified horizontal UI value and, thereafter, for generating the minimum and maximum voltage array input values (x values) from the identified voltages.

In accordance with an embodiment of the present invention, the eye height optimization problem can be derived as follows:

$$V_{eye} = \min(\{y_{bit1}\}) - \max(\{y_{bit0}\}) \qquad (3)$$
$$= \min(\{y_{bit11}\}, \{y_{bit01}\}) - \max(\{y_{bit10}\}, \{y_{bit00}\})$$
$$= \min(\min(\{y_{bit11}\}), \min(\{y_{bit01}\})) -$$
$$\max(\max(\{y_{bit10}\}), \max(\{y_{bit00}\}))$$

where $\{y_{bitxx}\}$ denotes the voltage array measured at UI center for the last bits in a bit pattern specified by "xx". For example $y_{bit01}$ stands for the voltage measured for all of the 1 bits that have previous bits of 0. Note that from equation (1) and equation (2), the items in equation (3) can be written as:

$$\min(\{y_{bit11}\}) = \min(\{x_{bit11}\} - d_1) = \min(\{x_{bit11}\}) - d_1 = x_{bit11}^{min} - d_1 \qquad (4)$$

$$\min(\{y_{bit01}\}) = \min(\{x_{bit01}\} + d_1) = \min(\{x_{bit01}\}) + d_1 = x_{bit01}^{min} + d_1$$

$$\max(\{y_{bit10}\}) = \max(\{x_{bit10}\} - d_1) = \max(\{x_{bit10}\}) - d_1 = x_{bit10}^{max} - d_1$$

$$\max(\{y_{bit00}\}) = \max(\{x_{bit00}\} + d_1) = \max(\{x_{bit00}\}) + d_1 = x_{bit00}^{max} + d_1$$

where $$x_{bit11}^{min} = \min(\{x_{bit11}\}) \qquad (5)$$

It should be noted that the values $x_{bit11}^{min}$, $x_{bit01}^{min}$, $x_{bit10}^{max}$, $x_{bit00}^{max}$ in equation (5) are measured using the input signal x. Accordingly, in one embodiment of the present invention the processor 660 may be operable to access and execute stored instructions from the memory means 700 and data from memory means 700 to generate the minimum and maximum voltage array input values (x values above) derived from a sampled input signal (value $x_k$ above).

It should be further noted that the sampled input signal may, or may not, have been output from a CTLE. If no CTLE is involved the input signal may be output from a channel or signal source.

The variables defined in equation (4) are linear functions of $d_1$. In accordance with embodiments of the present invention they may be represented as the thinner straight lines in FIG. 7.

The minimum of all 1 bits and the maximum of all 0 bits defined in equation (3) can be written as piece-wise linear function (the thicker lines in FIG. 7) as:

$$\min(\{y_{bit1}\}) = \min(\min(\{y_{bit11}\}), \min(\{y_{bit01}\})) \qquad (6)$$
$$= \begin{cases} x_{bit01}^{min} + d_1, & d_1 \le 0.5(x_{bit11}^{min} - x_{bit01}^{min}) \\ x_{bit11}^{min} - d_1, & d_1 > 0.5(x_{bit11}^{min} - x_{bit01}^{min}) \end{cases}$$

$$\max(\{y_{bit0}\}) = \max(\max(\{y_{bit10}\}), \max(\{y_{bit00}\}))$$
$$= \begin{cases} x_{bit10}^{max} - d_1, & d_1 \le 0.5(x_{bit10}^{max} - x_{bit00}^{max}) \\ x_{bit00}^{max} + d_1, & d_1 > 0.5(x_{bit10}^{max} - x_{bit00}^{max}) \end{cases}$$

Accordingly, in an embodiment of the invention the processor 660 may be operable to access and execute stored instructions and data from the memory means 700 to generate minimum and maximum voltage array output values (y above) representing a plurality of eye heights based on the generated voltage array input values (x above) associated with a specified horizontal position of the unit interval and a feedback coefficient value ($d_1$).

Figure 7:
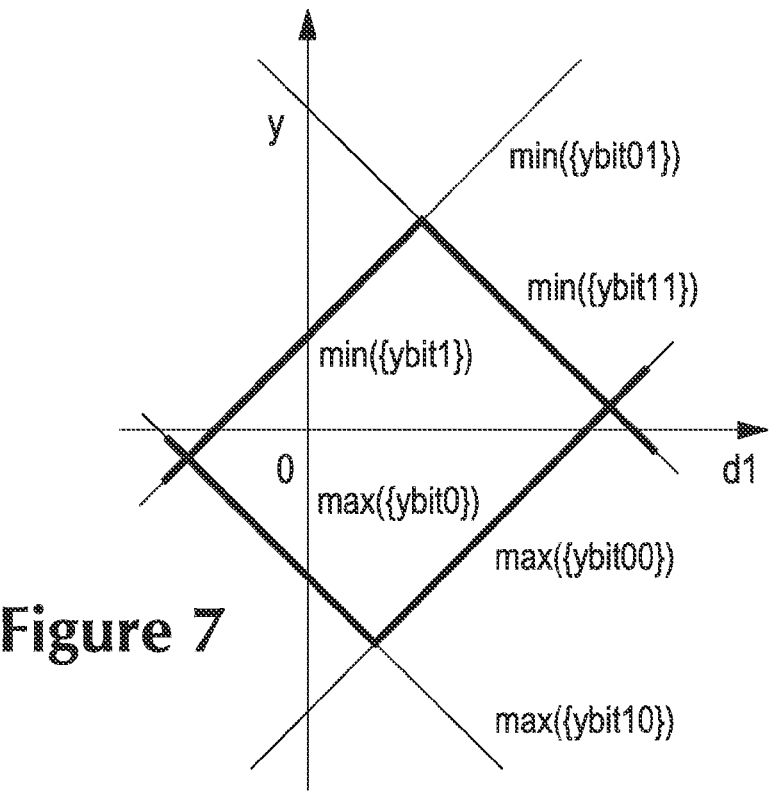
FIG. 7 depicts a representation of minimum and maximum bit voltages as a function of a DFE feedback coefficient in accordance with an embodiment of the present invention.
Figure 8:
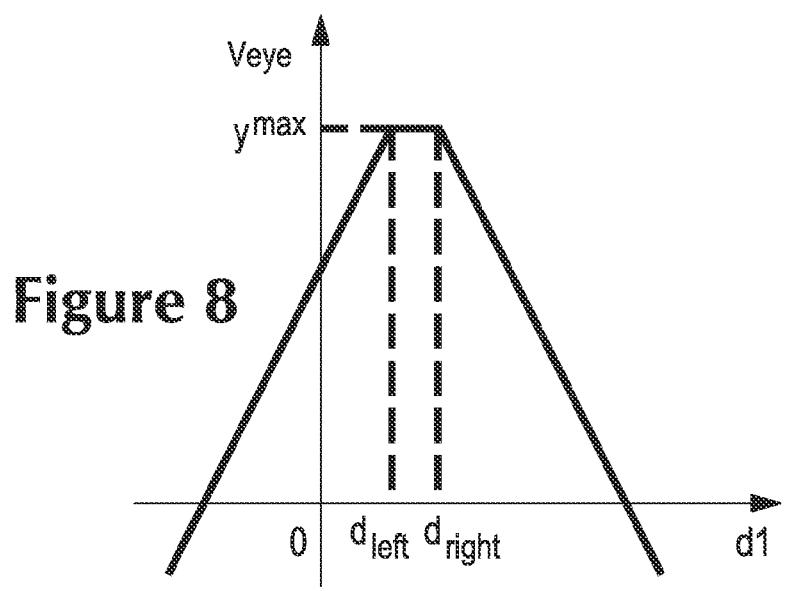
FIG. 8 depicts a representation of eye height as a function of a DFE feedback coefficient in accordance with an embodiment of the present invention.

As shown in FIG. 8, the eye height $V_{eye}$ set forth in equation (3) can then be derived as function of $d_1$ based on FIG. 7 and equation (6). In an embodiment of the invention, this may be implemented using the processor 660 that is operable to access and execute stored instructions and data within memory means 700 for identifying a maximum voltage value representing a maximum eye height based on the generated voltage array output values.

In accordance with an embodiment of the present invention, the eye height function $V_{eye}$ shown in FIG. 8 can be represented as an explicit piece-wise linear function:

$$V_{eye} = \min(\{y_{bit1}\}) - \max(\{y_{bit0}\}) \qquad (7)$$
$$= \begin{cases} y^{max} + 2(d_1 - d_{left}), & d_1 < d_{left} \\ y^{max}, & d_{left} \le d_1 \le d_{right} \\ y^{max} + 2(d_{right} - d_1), & d_1 > d_{right} \end{cases}$$

where $$d_{left} = \min(0.5(x_{bit11}^{min} - x_{bit01}^{min}), 0.5(x_{bit10}^{max} - x_{bit00}^{max}))$$

$$d_{right} = \max(0.5(x\_bit11\hat{}min - x\_bit01\hat{}min), 0.5(x\_bit10\hat{}max - x\_bit00\hat{}max)) \qquad (8)$$

$$y^{max} = 0.5(x_{bit11}^{min} + x_{bit01}^{min} - x_{bit10}^{max} - x_{bit00}^{max}) - (d_{right} - d_{left}) \qquad (8)$$

An optimal value of $d_1$ with the consideration of the limits on $d_1$ may be explicitly computed based on the piece-wise linear equation (7). In accordance with an embodiment of the invention, this may be implemented using the processor 660 that is operable to access and execute instructions and data from memory means 700 in order to identify one or more optimum feedback coefficient values based on the identified, maximum voltage value.

Once the optimum feedback coefficient values are identified, in accordance with an embodiment of the invention the processor 660 may be further operable to access and execute stored instructions and data from memory means 700 in order to generate a non-linear, equalized output signal ($y_k$) based on the one or more identified, optimum feedback coefficient values. In sum, it can be said then that the processor 660, in effect, completes a DFE adaption process by identifying one or more optimum feedback coefficient values based on an identified, maximum voltage value, wherein the identified maximum voltage value is associated with a specified horizontal position of the UI by virtue of the inter-relationship of the UI and the steps involved in identifying the maximum voltage value.

Figure 9:
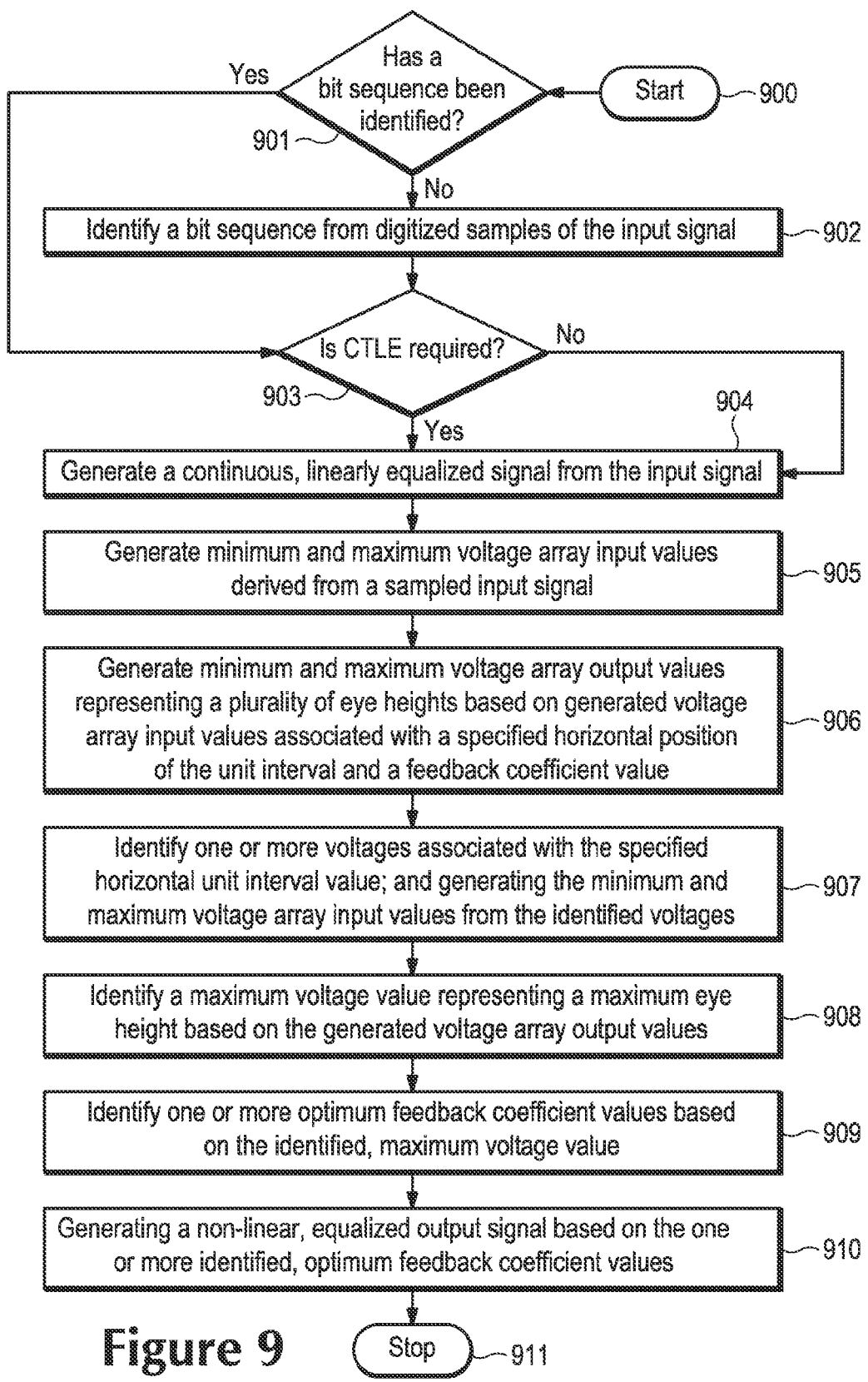
FIG. 9 depicts a flow diagram summarizing optimum DFE processes according to embodiments of the present invention

FIG. 9 depicts a flow diagram summarizing the methods set forth above that optimize a DFE according to embodiments of the present invention. As shown in FIG. 9, an exemplary method may include one or more of the following:

identifying a bit sequence from digitized samples of the input signal if one has not already been identified, in steps 901, 902;

if CTLE is required, generating a continuous, linearly equalized signal from the input signal, in steps 903,904.

thereafter, generating minimum and maximum voltage array input values derived from a sampled input signal, in step 905;

generating minimum and maximum voltage array output values representing a plurality of eye heights based on generated voltage array input values associated with a specified horizontal position of the unit interval and a feedback coefficient value, in step 906;

identifying one or more voltages associated with the specified horizontal unit interval value; and generating the minimum and maximum voltage array input values from the identified voltages, in step 907;

identifying a maximum voltage value representing a maximum eye height based on the generated voltage array output values, in step 908;

identifying one or more optimum feedback coefficient values based on the identified, maximum voltage value, in step 909; and generating a non-linear, equalized output signal based on the one or more identified, optimum feedback coefficient values, in step 910.

To further illustrate the concepts on the present invention, the following example is presented. A real-time oscilloscope, like system 400, acquires and converts an 8 Gb/s PCIE 3.0 analog input waveform signal x into digital signal samples using the acquisition means 620. The digitized signal samples may then be stored in memory means 700. Once digital signal samples are stored, the processor 660 may be operable to access executable instructions and the stored digitized samples in memory means 700 to complete post-processing on the samples. For example, the processor 660 may be operable to access the stored digitized signal samples of the input signal and executable instructions in memory means 700 in order to identify a training or bit sequence by, for example, using the process set forth in U.S. Non-Provisional patent application Ser. No. 12/423,604. Thereafter, post-processing may further include completing DFE adaption using a DFE adaptation module that is part of the processor 660.

It should be understood that instructions and data for implementing such a process may be stored in memory means 700. The processor 660 may, optionally, access executable instructions and data (e.g., digitized signal samples of waveform x) from memory means 700 to generate a continuous, linearly equalized signal using an optional CTLE module within the processor 660 prior to a DFE adaption process.

In accordance with an embodiment of the invention, the processor 660 may be operable to process the identified training or bit sequence to generate equalization taps that may be used to filter or equalize an analog input waveform signal from channel 500 in order to remove degradations caused by channel losses, reflections, cross talk, noise, and ISI.

In more detail, for example the processor 660 may be further operable to access executable instructions and data from memory means 700 in order to identify the minimum and maximum voltages for bits defined in equation (5), for example:

$x_{bit11}{}^{min} = 96.4$ mV $x_{bit01}{}^{min} = 34.3$ mV $x_{bit10}{}^{max} = -41.5$ mV $x_{bit00}{}^{max} = -99.7$ mV The processor 660 may then access executable instructions and data in memory means 700 for implementing the explicit piecewise linear function defined in equations (7) and (8) derived from these measurements. For example, if [−30 mV, 30 mV] is the limit of $d_1$, the processor 660 (e.g., DFE adaption module) may be operable to access executable instructions and data in memory means 700 in order to generate an optimal eye height voltage of $V_{eye} = 134.0$ mV.

Based on this eye height voltage the processor 660 (again, for example, a DFE adaption module that is a part of processor 660) may, thereafter, be operable to access executable instructions and data in memory means 700 in order to compute d1, for example, as having a value in the range [29.1 mV, 30 mV].

It should be noted that, In comparison, if DFE equalization is not completed the eye height is $V_{eye} = 75.7$ mV.

Figure 10A:
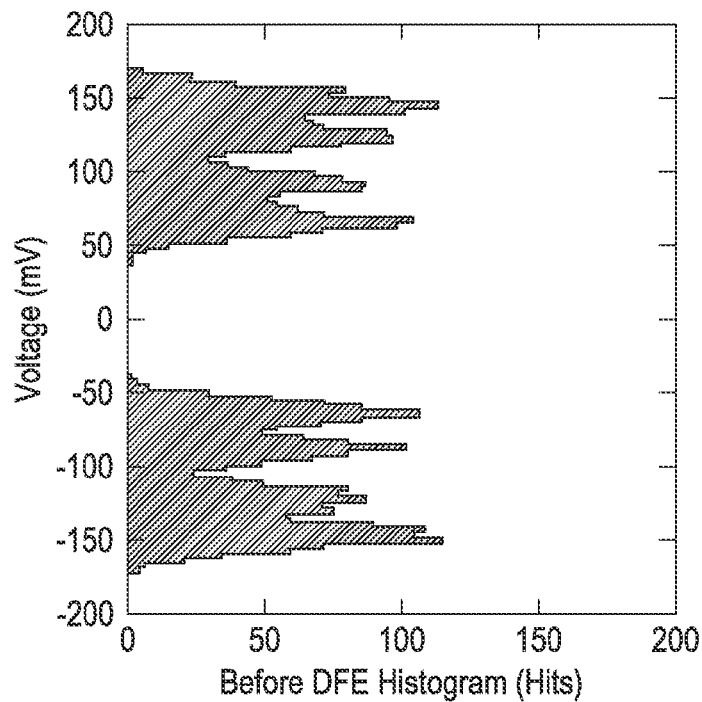
FIGS. 10A and 10B depict histograms both before and after DFE in accordance with an embodiment of the present invention.
Figure 10B:
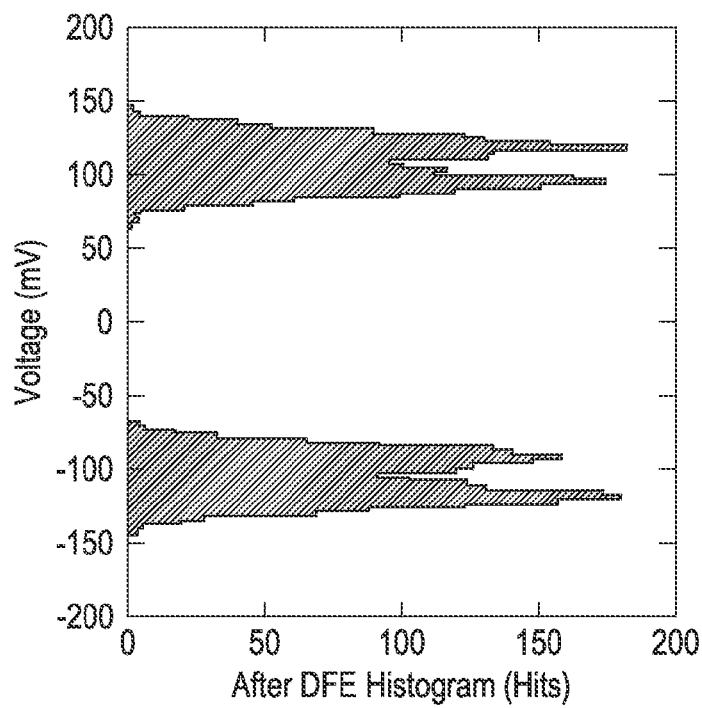

FIGS. 10A and B depict vertical histograms at UI center before and after DFE, respectively, as displayed on an oscilloscope such as system 400. As shown in these FIGUREs DFE adaption makes the eye open wider.

Figure 11:
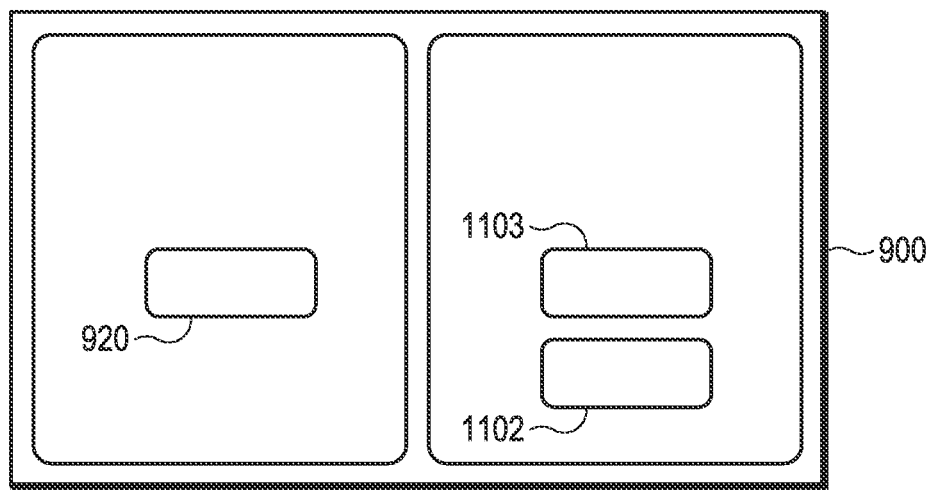
FIG. 11 depicts a user interface that is a part of an oscilloscope for activating an optimum DFE process according an embodiment of the present invention.

Turning to FIG. 11 there is depicted a user interface 900 that may be part of a performance oscilloscope for activating an optimum DFE process according an embodiment of the present invention. For example, the user interface 900 may be part of the display section 520. In accordance with an embodiment of the invention, an activation icon 920 may be displayed on the interface 900 which when clicked with a mouse, touched with a finger or otherwise activated begins the process of executing the DFE adaption process(es) for a high speed serial data signal of at least 6 gigabits per second described above. A save icon 1102 may be selected to (e.g., clicked, touched) to save the results of a DFE adaption process, for example in memory means 700. The user interface 900 may also include icon 1103 that may be displayed for indicating when the DFE adaption process described above (e.g., one that, in sum, identifies one or more optimum feedback coefficient values based on an identified, maximum voltage value associated with a specified horizontal position of the UI), is completed. It should be understood that the positioning of the icons 920, 1102 and 1103 is only for illustrative purposes and that their position may be altered without changing their function or the scope of the invention. Further, though shown as three separate icons one or more of the icons 920, 1102 and/or 1103 may be combined into as few as one icon (e.g., an icon that blinks at a certain rate depending on its function, or uses different colors depending on its function) or may be further separated into additional icons.

It should be noted that variations may be made to the details of the above-described embodiments of this invention without departing from the underlying principles thereof. For example, the DFE adaption process described above may be applied to both single and multi-tap DFEs. The scope of the present invention should, therefore, be determined primarily by the following claims.

What is claimed is:

1. A system for optimizing equalization of a high-speed data link with a processor comprising:
   means for generating minimum ($x^{min}$) and maximum voltage ($x^{max}$) array input values derived from a sampled input signal x;
   means for generating minimum and maximum voltage array output values representing a plurality of eye heights based on generated voltage array input values associated with a specified horizontal position of the unit interval and based on a single feedback coefficient value;
   means for identifying a maximum voltage value $y^{max}$ representing a maximum eye height based on the generated voltage array output values;
   means for identifying one or more optimum feedback coefficient values, $d_{right}$ and $d_{left}$, based on the identified maximum voltage value; and
   means for generating a non-linear, equalized output signal based on the one or more identified optimum feedback coefficient values;
   wherein $y^{max}=0.5(x_{bit11}^{min}+x_{bit01}^{min}-x_{bit10}^{max}-x_{bit00}^{max})-(d_{right}-d_{left})$.

2. The system as in claim 1, wherein the system comprises a performance oscilloscope.

3. The system as in claim 1, further comprising means for selecting the specified horizontal position of the unit interval.

4. The system as in claim 1, wherein the sampled input signal comprises a high speed serial data signal.

5. The system as in claim 4, wherein the high speed serial data signal comprises at least 6 gigabits per second.

6. The system in claim 1, further comprising means for generating a continuous, linearly equalized signal from the input signal.

7. The system as in claim 1, further comprising means for identifying one or more voltages associated with the specified horizontal unit interval value and means for generating the minimum and maximum voltage array input values from the identified voltages.

8. The system as in claim 1, further comprising:
   a user interface for activating decision feedback equalization (DFE), and for indicating when the DFE is completed; and
   a display for displaying the user interface.

9. A method for optimizing equalization of a high-speed data link comprising:
   generating minimum ($x^{min}$) and maximum ($x^{max}$) voltage array input values derived from a sampled input signal x;
   generating minimum and maximum voltage array output values representing a plurality of eye heights based on generated voltage array input values associated with a specified horizontal position of the unit interval and based on a single feedback coefficient value;
   identifying a maximum voltage value $y_{max}$ representing a maximum eye height based on the generated voltage array output values;
   identifying one or more optimum feedback coefficient values, $d_{right}$ and $d_{left}$, based on the identified maximum voltage value; and
   generating a non-linear, equalized output signal based on the one or more identified optimum feedback coefficient values;
   wherein $y^{max}=0.5(x_{bit11}^{min}+x_{bit01}^{min}-x_{bit10}^{max}-x_{bit00}^{max})-(d_{right}-d_{left})$.

10. The method as in claim 9, wherein the method is implemented using a performance oscilloscope.

11. The method as in claim 9, further comprising selecting the specified horizontal position of the unit interval.

12. The method as in claim 9, wherein the sampled input signal comprises a high speed serial data signal.

13. The method as in claim 12, wherein the high speed serial data signal comprises at least 6 gigabits per second.

14. The method as in claim 9, further comprising generating a continuous linearly equalized signal from the input signal.

15. The method as in claim 9, further comprising:
   identifying one or more voltages associated with the specified horizontal unit interval value; and
   generating the minimum and maximum voltage array input values from the identified voltages.

16. A non-transitory computer-readable media in a performance oscilloscope storing computer-executable instructions that, when executed by a processor, operate to perform the method according to claim 9.

* * * * *